US008089873B2

(12) United States Patent  
Park (10) Patent No.: US 8,089,873 B2  
(45) Date of Patent: Jan. 3, 2012

(54) METHOD AND SYSTEM OF MANAGING QOS-GUARANTEED MULTIMODE FAST MOBILITY IN WIRELESS NETWORKS

(75) Inventor: Jong-Tae Park, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 412 days.

(21) Appl. No.: 12/382,993

(22) Filed: Mar. 27, 2009

(65) Prior Publication Data

US 2010/0103872 A1    Apr. 29, 2010

Related U.S. Application Data

(60) Provisional application No. 61/108,874, filed on Oct. 28, 2008.

(51) Int. Cl.  
*H04L 12/26* (2006.01)

(52) U.S. Cl. .................. 370/230; 370/235; 370/332

(58) Field of Classification Search .............. 370/310.2, 370/328, 331, 332, 338, 349, 235, 230, 229, 370/236, 285, 400, 401, 402  
See application file for complete search history.

(56) References Cited

U.S. PATENT DOCUMENTS

| 7,426,213 B2 * | 9/2008 | Xu et al. ........................ 370/401 |
| 7,583,632 B2 * | 9/2009 | Janevski et al. ............... 370/331 |
| 2008/0089287 A1 * | 4/2008 | Sagfors et al. ................ 370/331 |

* cited by examiner

*Primary Examiner* — Brenda H Pham (74) *Attorney, Agent, or Firm* — The Nath Law Group; Jerald L. Meyer; Jiaxiao Zhang (57) ABSTRACT

Disclosed herein is a method and system for managing QoS-guaranteed multimode fast mobility in wireless networks. The method includes the steps of (a) in response to a request for call establishment, registering a user ID, the unique IP address of a user, a currently used temporary IP address and the current location of the mobile host; (b) completing the call establishment; (c) establishing a tunnel between the OMS and the mobile host; (d) in response to the provision of a new temporary IP address and the wireless network information of a newly activated wireless communication interface, establishing a new tunnel using the unique IP address of the OMS and the new temporary IP address of the mobile host, and then transmitting data packets in parallel; and (e) in response to a request for the removal of a tunnel, removing the corresponding tunnel.

14 Claims, 7 Drawing Sheets

| User ID | Unique ID Address | Number of Parallel Connections | Current connection information (temporary IP address, Authentication, bandwidth) | QoS | rest |
|---------|-------------------|-------------------------------|----------------------------------------------------------------------------------|-----|------|
| ⋮ | ⋮ | ⋮ | ⋮ | ⋮ | ⋮ |
| ⋮ | ⋮ | ⋮ | ⋮ | ⋮ | ⋮ |

METHOD AND SYSTEM OF MANAGING QOS-GUARANTEED MULTIMODE FAST MOBILITY IN WIRELESS NETWORKS

BACKGROUND OF THE INVENTION

1. Field of the Invention

The present invention relates to a method and system for managing Quality of Service (QoS)-guaranteed multimode fast mobility in wireless networks that is capable of efficiency supporting real-time multimedia services, such as Internet Protocol (IP)-based voice call, video call and video conference, without deterioration of QoS when a mobile host equipped with two or more wireless communication interfaces moves between cells of homogeneous or heterogeneous wireless networks. Here, the "wireless networks" include Wireless Personal Area Networks (WPANs), Wireless Local Area Networks (WLANs), Wireless Metropolitan Area Networks (WMANs) and Wireless Wide Area Networks (WWANs).

2. Description of the Related Art

The art related to the present invention will be described first. A next-generation wireless communication network will be constructed in such a way that WPANs, WLANs and WMANs, which are being developed by the IEEE 802 working group, as well as third-generation (3G) and fourth-generation (4G) wideband WWANs will be interconnected on an all-IP basis. Across these various wireless communication networks, each mobile host will operate in a multimode based on a plurality of different wireless communication interfaces and support IP-based mobile real-time multimedia services such as mobile Voice over IP (VoIP), mobile IPTV and mobile real-time video conference. From the standpoint of a user, although the next-generation wireless communication network has fast packet transmission capability, there is a problem in that a mobile host does not provide a fast mobility management function capable of guaranteeing the provision of real-time multimedia services when the mobile host moves between homogeneous or heterogeneous wireless networks.

The prior art related to the management of mobility when a mobile host moves between cells of various wireless networks will be described next. There is a Generic Access Network (GAN) structure that was proposed by the UMA Forum as the ETSI TS standard in order to perform the mobility management of a dual mode phone that enables switching between a Global System for Mobile communication (GSM) network and an IEEE 802.11 WLAN without disruption of service. Meanwhile, the Internet Multimedia System (IMS) forum has carried out research into a scheme for supporting seamless VoIP in various wired/wireless converged communication networks on the basis of Session Initiation Protocol (SIP). Furthermore, the Fixed Mobile Convergence Alliance (FMCA) announced a technology for enabling interworking between a Bluetooth WPAN and a cellular wireless network. However, the GAN and IMS technologies are technologies for providing seamless IP connection from the standpoint of a service provider, and have problems in that service disruption occurs in the case of the occurrence of change in the IP address of a mobile host and it does not guarantee QoS and does not provide a fast handover function during movement.

In addition to these work, there are Mobile IP (MIP), Fast MIP and Hierarchical MIP developed by IETF, which is an Internet standardization organization, to support IP mobility management, SCTP-ADDIP developed to support mobility management in the transport layer, and SIP developed to support mobility management in the application layer. However, most of the IETF handover international standards do not provide a fast mobility management function of guaranteeing QoS in various heterogeneous wireless networks. Recently, the IETF multi-homing working group has carried out research into a method for improving distributed system service reliability or performance related to a mobile node in the case where the mobile node is equipped with a plurality of different interfaces and has a plurality of temporary IP addresses. However, unlike the research in the IETF multi-homing working group, the present invention enables parallel distributed packet tunnels to be established through an SIP-based Open Mobility Management Server (OMS) at an intermediate location, rather than at end-to-end locations, using a plurality of interfaces and then enables mobility management to be performed therethrough, so that the present invention is different from the research that has been carried out by the IETF multi-homing working group.

Additionally, although the IEEE 802.21 working group developed the Media Independent Handover (MIH) standard interface for enabling interworking between various wireless networks in the data link layer, it does not propose a method for guaranteeing QoS when hosts move.

In conclusion, although many technologies and international standards have been developed up to now, there is no reliable QoS-guaranteed fast wireless network mobility management for guaranteeing seamless mobility to users when mobile hosts move between various wireless networks.

SUMMARY OF THE INVENTION

Accordingly, the present invention has been made keeping in mind the above problems occurring in the prior art, and an object of the present invention is to provide a QoS-guaranteed fast mobile management function capable of efficiently supporting IP-based multiparty real-time multimedia services regardless of the types of wireless networks when various mobile hosts, such as a mobile phone, an Internet phone, a PMP, an UltraPC, a smart phone and a notebook, move between cells of homogeneous or heterogeneous wireless networks.

Another object of the present invention is to provide a QoS-guaranteed fast mobility management structure and function for, in the case where QoS is reduced during the movement of a mobile host, enabling the dynamic establishment of a bidirectional tunnel through a plurality of new wireless networks and the parallel transmission of data, thereby increasing the reduced QoS, being able to be independent of the higher transport and application layers, and eliminating packet loss or time delay attributable to handover.

Still another object of the present invention is to provide a QoS-guaranteed fast mobility management function that can be applied to both an IPv4 network and an IPv6 network.

STRUCTURE OF THE INVENTION

The present invention relates to a method and system for managing QoS-guaranteed multimode fast mobility in wireless networks that is capable of efficiently supporting IP-based real-time multimedia services regardless of the types of wireless networks when a mobile host equipped with a plurality of wireless communication interfaces moves between cells of the wireless networks.

In order to accomplish the above object, the present invention provides a method for managing QoS-guaranteed multimode fast mobility in an OMS, the method being capable of efficiently supporting IP-based real-time multimedia services in wireless networks regardless of types of wireless networks when a mobile equipped with a multimode communication interface including a plurality of wireless communication interfaces moves between cells of the wireless networks, the method including the steps of:

(a) when a request for call establishment with a specific counterpart host is made by the mobile host, registering and storing a user ID, a unique IP address of a user, a currently used temporary IP address and a current location of the mobile host, provided by the mobile host, in a mobility management information table; (b) completing the call establishment between the mobile host and the counterpart host; (c) after the call establishment between the mobile host and the counterpart host has been completed, establishing a tunnel between the OMS (Open Mobility Management Server) and the mobile host using a unique IP address of the OMS and a temporary IP address of the mobile host, and then transmitting data; (d) when a new temporary IP address and wireless network information of a newly activated wireless communication interface are provided by the mobile host, establishing a new tunnel between the OMS and the mobile host using the unique IP address of the OMS and the new temporary IP address of the mobile host, and then transmitting and receiving data packets via the existing tunnel and the new tunnel in parallel; and (e) when a request for removal of one from currently activated tunnels is made by the mobile host, removing the corresponding tunnel.

In the method, the step (b) includes the steps of (b1) registering an IP address of the counterpart host in the mobility management information table; and (b2) transferring a call establishment and response signal to the temporary IP address of the mobile host and the IP address of the counterpart host, thereby completing the call establishment between the counterpart host and the mobile host.

In the method, the step (d) includes, when the new temporary IP address and the wireless network information of the newly activated wireless communication interface are provided by the mobile host, detecting congestion status or an access right for the corresponding wireless network, and transmitting the information to the mobile host.

In the method, the mobility management information table includes user identification information and unique IP address of the mobile host with which a call has been established, the number of parallel IP connections to the mobile host, current connection information and QoS information, and the current connection information includes a temporary IP address, authentication information and bandwidth information.

Additionally, the present invention provides a system for managing QoS-guaranteed multimode fast mobility, including a mobile host equipped with a multimode communication interface including a plurality of wireless communication interfaces; and an OMS for supporting IP-based real-time multimedia services regardless of types of wireless networks when the mobile host moves between cells;

the mobile host including a call establishment unit for providing mobility management information to the OMS, and requesting call establishment with a specific counterpart host, thereby enabling the call establishment; a mobility management unit for, after completion of the call establishment, establishing a tunnel while operating in conjunction with the OMS, and, when QoS of an existing tunnel is reduced, activating a sleep wireless communication interface, connecting with a new wireless network, being assigned a new temporary IP address, and providing the new temporary IP address to the OMS, thereby establishing a new tunnel; a parallel data transmission/reception unit for transmitting and receiving data via a plurality of tunnels established by the mobility management unit in parallel; and a QoS monitor for monitoring communication service quality of the tunnel between the mobile host and the OMS, and transmitting the monitored information to the OMS; and the OMS includes a mobility management information table for registering and storing mobility management information of the mobile host provided by the mobile host that has requested call establishment with the specific counterpart host; a call establishment unit for completing call establishment between the mobile host and the counterpart host in response to the request for the call establishment; a mobility management unit for, after the call establishment between the mobile host and the counterpart host has been completed, establishing a tunnel for transmitting data between the OMS and the mobile host, establishing a new tunnel between the mobile host and the OMS when a new temporary IP address and wireless network information of a newly activated wireless communication interface are provided by the mobile host, and removing one tunnel from currently activated tunnels when a request for the removal of the corresponding tunnel is made by the mobile host; and a parallel data transmission/reception unit for transmitting and receiving data to and from the mobile host via the plurality of established tunnels.

In the system, the mobility management information includes a user ID, a unique IP address of a user, a currently used temporary IP address, and current location information of the mobile host.

In the system, the mobility management unit of the OMS, when wireless network information of a newly activated wireless communication interface is provided by the mobile host, detects congestion status or an access right for the corresponding wireless network, and transmits it to the mobile host.

In the system, each of the parallel data transmission/reception unit of the mobile host and the parallel data transmission/reception unit of the OMS includes a parallel packet distributor for transmitting packets via a plurality of tunnels established between the OMS and the mobile host in parallel and a parallel packet collector for collecting packets arriving via the plurality of tunnels.

In the system, the mobility management information table of the OMS includes user identification information and unique IP address of the mobile host with which a call has been established, the number of parallel IP connections to the mobile host, current connection information and QoS information, and the current connection information includes a temporary IP address, authentication information and bandwidth information.

Additionally, the present invention provides a mobile host equipped with a multimode communication interface, including the multimode communication interface including a plurality of wireless communication interfaces; a call establishment unit for providing mobility management information to an external OMS, and requesting call establishment with a specific counterpart host, thereby enabling the call establishment; a mobility management unit for, after completion of the call establishment, establishing a tunnel with the OMS, and, when QoS of an existing tunnel is reduced, activating a sleep wireless communication interface, connecting with a new wireless network, being assigned a new temporary IP address, and providing the new temporary IP address to the OMS, thereby establishing a new tunnel; a parallel data transmission/reception unit for transmitting and receiving data via a plurality of tunnels established by the mobility management unit in parallel; and a QoS monitor for monitoring communication service quality of the tunnel to the OMS, and transmitting the monitored information to the OMS; wherein the mobile host can receive IP-based real-time multimedia services in conjunction with the external OMS regardless of types of wireless networks when the mobile host moves between cells.

Additionally, the present invention provides an OMS including a mobility management information table for registering and storing registers and stores the user ID, user's unique IP address and currently used temporary IP address of a mobile host that is equipped with a multimode communication interface including a plurality of wireless communication interfaces and has requested a call establishment with a specific counterpart host, and the current location of the mobile host; a call establishment unit for completing call establishment between the mobile host and the counterpart host; a mobility management unit for, after the call establishment between the mobile host and the counterpart host has been completed, establishing a tunnel for transmitting data between the OMS and the mobile host, establishing a new tunnel between the mobile host and the OMS when a new temporary IP address and wireless network information of a newly activated wireless communication interface are provided by the mobile host, and removing one tunnel from currently activated tunnels when a request for the removal of the corresponding tunnel is made by the mobile host; and a parallel data transmission/reception unit for transmitting and receiving data via the plurality of established tunnels; wherein the OMS efficiently supports IP-based real-time multimedia services regardless of types of wireless networks when the mobile host moves between cells of the wireless networks.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The construction and operation of embodiments of the present invention will be described below with reference to the accompanying drawings. The construction and operation of the present invention shown and illustrated in each of the drawings will be described as at least one embodiment, by which the technical spirit and core construction and operation of the present invention are not limited.

Figure 1:
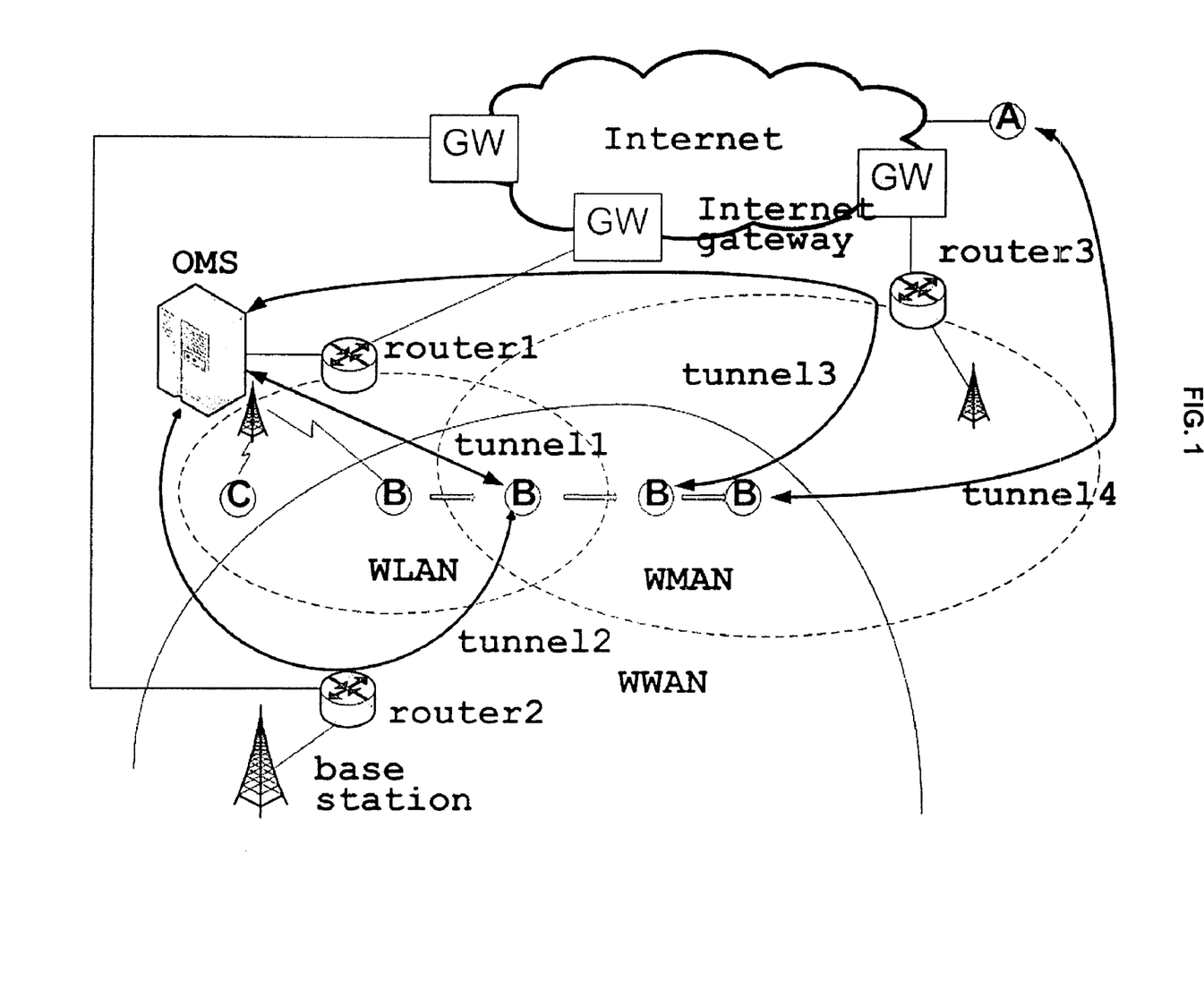
FIG. 1 is a diagram showing a system for managing QoS-guaranteed fast mobility according to the present invention.

FIG. 1 is a diagram showing the construction of a system for managing QoS-guaranteed fast mobility according to the present invention. The "communication QoS" described in the present invention may be defined as data transmission rate or bandwidth, packet loss, time delay and response time that should be guaranteed for a specific multimedia communication service even when QoS is changed due to the congestion of a wireless network or a reduction in the intensity of radio waves during the movement of a mobile host.

Referring to FIG. 1, the schematic operation of the system for managing QoS-guaranteed fast mobility according to the present invention is as follows. A mobile host B communicates with a counterpart host A through a WLAN base station, a router 1 and an OMS. In this case, the router 1 and the OMS may operate as a single integrated system. In the case where QoS is reduced due to a reduction in the intensity of received radio waves because the mobile host B moves away from the base station during movement, the mobile host B, in order to compensate for the reduction in QoS, activates a WWAN interface, connects with a WWAN, is assigned a temporary IP by a router 2, and then establishes a tunnel 2 with the OMS. Thereafter, data is simultaneously transmitted and received in parallel using an existing tunnel 1 and a tunnel 2. By doing so, the available effective bandwidth is increased, and thus the reduction in the bandwidth in the tunnel 1 is compensated for, thereby guaranteeing QoS. When the mobile host B continues to move, the mobile host B is disconnected from a WLAN assess point, accesses a WMAN, connects with the OMS via a tunnel 3 and then communicates with the mobile host A. In this case, if QoS is guaranteed after the tunnel 3 has been established, the tunnel 2 is removed.

Through this process, the mobile host B directly establishes an end-to-end tunnel with the OMS and communicates, unlike in a conventional handover method in a general mobile communication network, so that a TCP connection and the like are not released even though an IP address is changed during movement. Furthermore, unlike in the conventional handover method, when QoS is reduced, a connection to an available new wireless network is previously established and then data is transmitted and received, so that packet loss or delay time attributable to handover can be eliminated during movement. Unlike in various existing IETF IP-based international IP handover standards, the mobile hosts A and B establishes a call through the OMS using a SIP-based user ID, so that user mobility and service mobility as well as host mobility can be provided. In particular, when the host A has a tunneling function like the mobile host B, the host A registers the user ID of the host B in the OMS, establishes a tunnel between the two ends, and directly transmits and receives data. In this case, seamless fast handover is supported for the mobile host A as well as the mobile host B during movement. The tunnel 4 shown in FIG. 1 corresponds to this case. Finally, FIG. 1 shows the case where the mobile host B may communicate with a mobile host C, connected to the router 1, without using a tunnel.

Figure 2A:
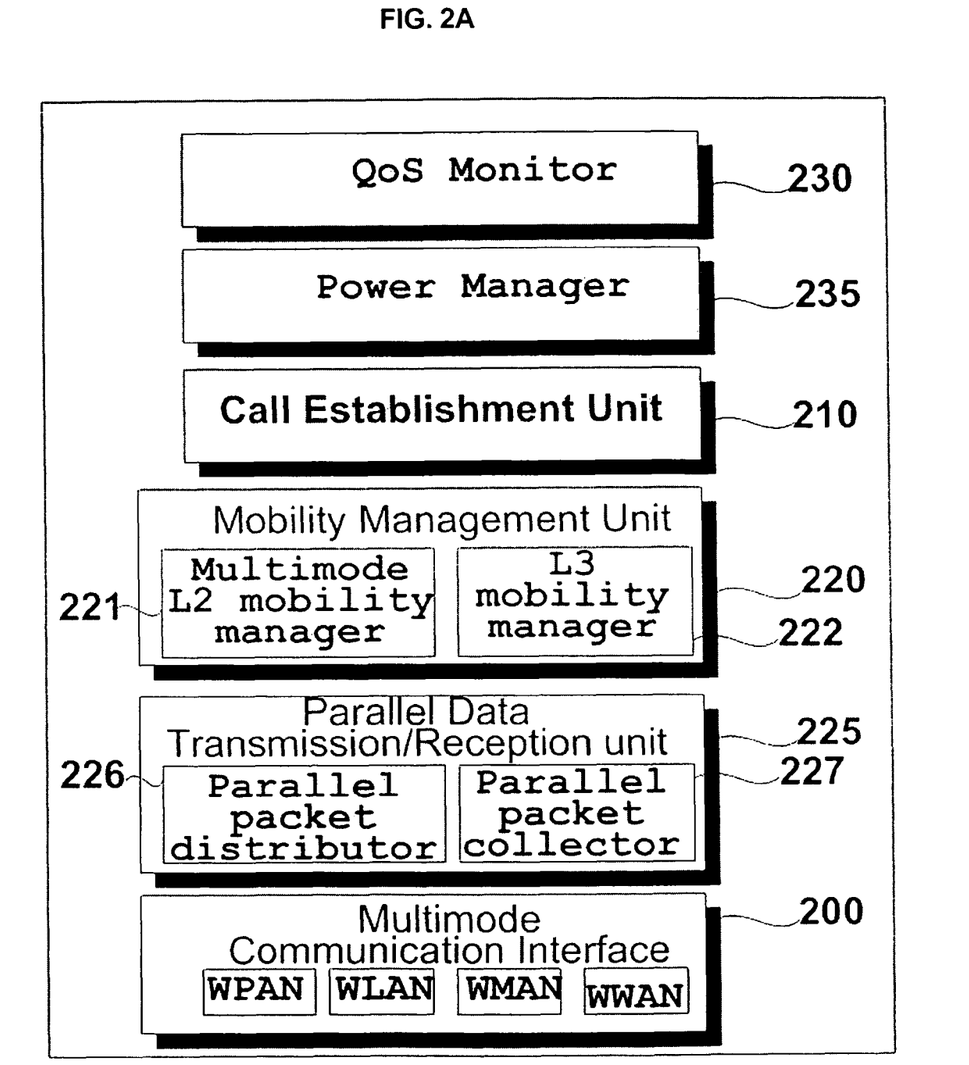
FIG. 2 is a diagram showing the construction of an OMS and a mobile host according to the present invention.
Figure 2B:
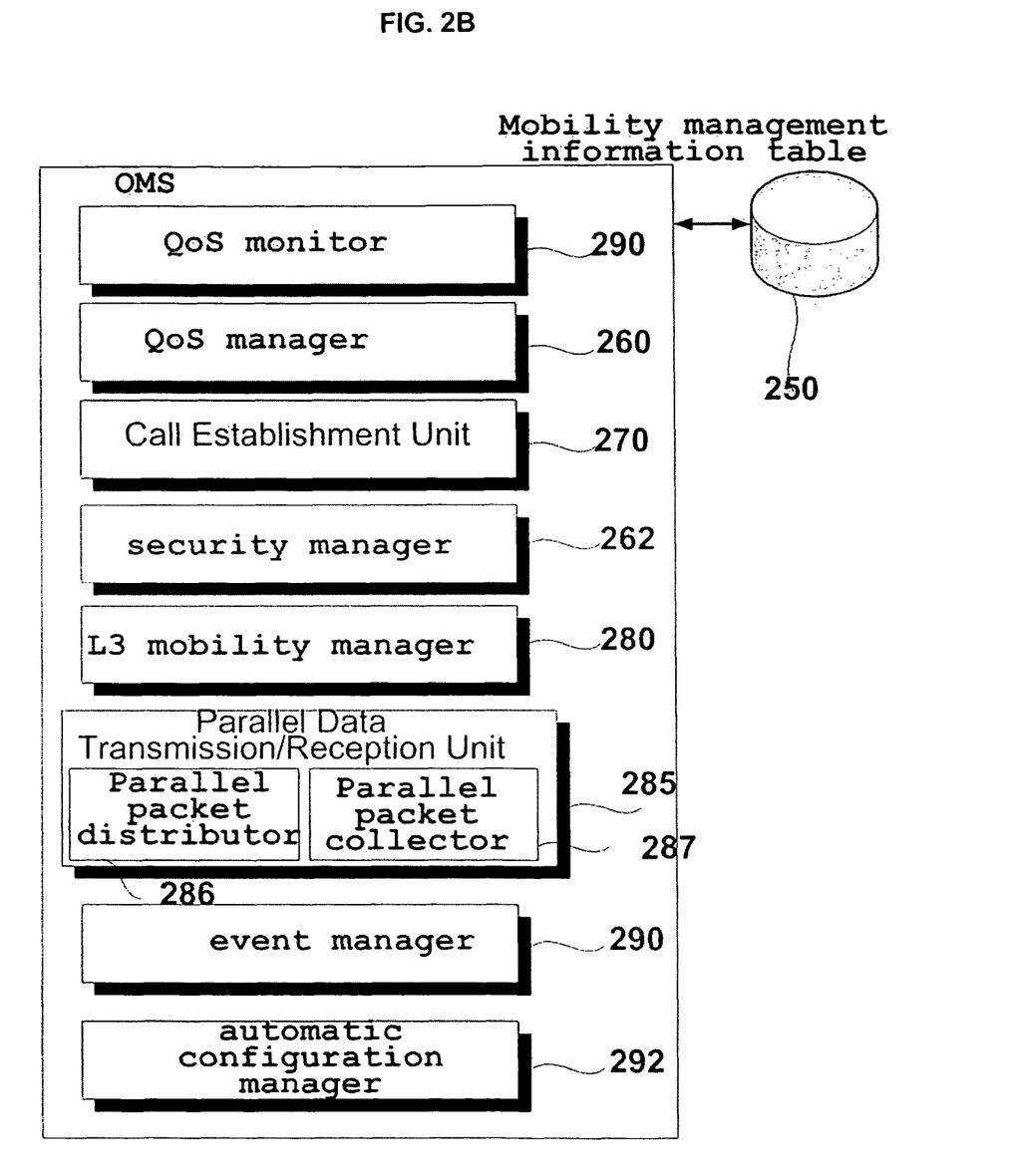

FIG. 2A and FIG. 2B are diagrams schematically showing only an internal structure for performing the mobility management of a mobile host and an OMS according to the present invention. Here, the term "open" implies that the OMS provides an SIP-based mobility management interface to perform mobility management.

With reference to FIG. 2A, the construction and operation of a mobile host according to the present invention will be described in detail below. Referring to FIG. 2A, the mobile host includes a multimode communication interface 200, a call establishment unit 210, a mobility management unit 220, a parallel data transmission/reception unit 225, a QoS monitor 230, and a power manager 235. The mobility management unit 220 includes a multimode L2 mobility manager 221 and an L3 mobility manager 222. The parallel data transmission/reception unit 225 includes a parallel packet distributor 226 and a parallel packet collector 227.

The multimode communication interface 200 may include a plurality of wireless communication interfaces in order to enable communication over a plurality of wireless communication networks such as a WPAN, a WLAN, a WMAN and a WWAN, and may wirelessly communicate with a server through one or more of them.

Figure 4:
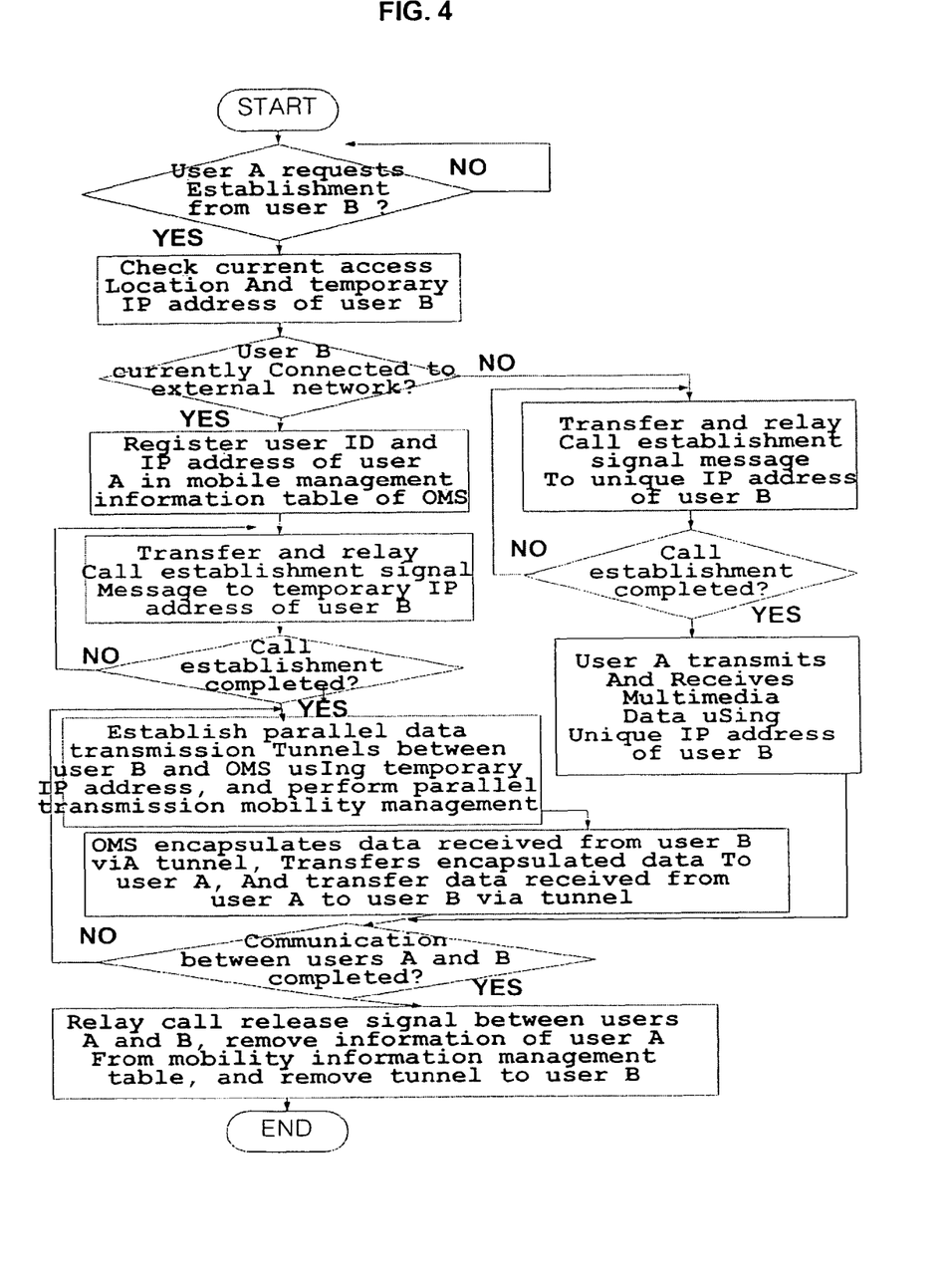
FIG. 4 is a flowchart showing an algorithm for call establishment and parallel data transmission call release through the OMS according to the present invention.

The call establishment unit 210 operates according to a call establishment and release algorithm shown in FIG. 4, provides mobility management information to the external OMS, requests a call establishment with a specific counterpart host, and completes a call establishment when it receives a response message from the counterpart host through the OMS. The mobility management information provided by the call establishment unit to the external OMS includes the mobile host's user ID, the user's unique IP address, a currently used temporary IP address, and the mobile host's current location information.

After the completion of the call establishment, the mobility management unit 220 establishes a tunnel with the OMS and transmits and receives data. Furthermore, if the QoS of the existing tunnel is reduced, the mobility management unit 220 activates a sleep wireless communication interface, connects with a new wireless network, is assigned a new temporary IP address, provides the ID address to the OMS, establishes a new tunnel, and transmits and receives data via the existing tunnel and the new tunnel. The mobility management unit 220 includes the multimode L2 mobility manager 221 and the L3 mobility manager 222. The multimode L2 mobility manager 221 searches for a wireless network link accessible during movement while operating in conjunction with the OMS, and performs layer 2 handover. Furthermore, the multimode L2 mobility manager also functions to communicate with a Media Independent Handover (MIH) server present in a mobile communication system through an IEEE 802.21 MIH and fetch and transfer information necessary for layer 2 mobility management. The L3 mobility manager 222 performs layer 3 handover for the guarantee of QoS while operating in conjunction with the OMS. Furthermore, when some of existing tunnels are removed due to the movement of the mobile host, the mobility management unit 220 establishes a new tunnel with the OMS, and transmits and receives data via the new tunnel and the remaining existing tunnel in parallel.

The parallel data transmission/reception unit 225 includes the parallel packet distributor 226 and the parallel packet collector 227. The parallel packet distributor 226 transmits packets via a plurality of tunnels established between the OMS and the mobile host in parallel, while the parallel packet collector 227 collects packets arriving via the plurality of tunnels. The mobility management unit 220 and the parallel data transmission/reception unit 225 operates in conjunction with each other, and operates according to the QoS guaranteeing mobility management algorithm shown in FIG. 6. A detailed description of the QoS guaranteeing mobility management algorithm shown in FIG. 6 will be given later.

The QoS monitor 230 monitors the communication QoS of the tunnel to the OMS using packet monitoring technology, and transmits the monitoring information to the OMS. The power manager 235 minimizes power consumption that may occur when communication is performed via a plurality of wireless communication modules in the case of a mobile host having a multimode communication interface. When the intensity of radio waves in a wireless network over which a tunnel has been established is reduced to a value equal to or less than a predetermined value, specific data transmission/reception is completed or the connection between the mobile host and the counterpart host is terminated, the QoS monitor 230 requests the removal of the corresponding tunnel from the OMS and keeps the corresponding wireless communication interface sleep.

The mobile host having the above-described construction has the multimode communication interface including a plurality of wireless communication interfaces, and receives IP-based real-time multimedia service during movement between cells regardless of the types of wireless networks while operating in conjunction with the external OMS.

The construction of the OMS of the system according to the present invention will be described below. As shown in FIG. 2B, the OMS includes a mobility management information table 250, a QoS manager 260, a security manager 262, a call establishment unit 270, an L3 mobility manager 280, a parallel data transmission/reception unit 285 and a QoS monitor 290, and the parallel data transmission/reception unit 285 includes a parallel packet distributor 286 and a parallel packet collector 287.

The mobility management information table 250 includes mobility management-related IETF SIP-based user information, a current connected IP address, and mobility management policies that are applied when a plurality of wireless networks is selected. The mobility management information table 250 registers and stores the user ID, user's unique IP address and currently used temporary IP address of a mobile host that has requested a call establishment with a specific counterpart host, and the current location of the mobile host. Furthermore, the mobility management information table includes the user ID and unique IP address of a mobile host with which a call has been currently established, the number of parallel IP connections to the mobile host, current connection information and QoS information. The current connection information includes a temporary IP address, authentication information and bandwidth information.

The call establishment unit 270, in response to the call establishment request from the mobile host, registers the IP address of the counterpart host in the mobility management information table and then transfers a call establishment and response message to the temporary IP address of the mobile host and the IP address of the counterpart host, thereby completing the call establishment between the two hosts.

After the completion of the call establishment between the mobile host and the counterpart host, the L3 mobility manager 280 establishes a tunnel for data transmission between the OMS and the mobile host. Furthermore, when a new temporary IP address and the wireless network information of a newly activated wireless communication interface are provided by the mobile host, the L3 mobility manager 28 establishes a new tunnel between the mobile host and the OMS. Furthermore, the L3 mobility manager 280 detects congestion status and an access right for a corresponding wireless network and then transmits the detected information to the mobile host when the wireless network information of the newly activated wireless communication interface is provided by the mobile host, and removes one tunnel from currently activated tunnels when a request for the removal of the corresponding tunnel is made by the mobile host.

The parallel data transmission/reception unit 285 includes the parallel packet distributor 286 and the parallel packet collector 287. The parallel packet distributor 286 transmits packets via a plurality of tunnels established between the OMS and the mobile host in parallel, while the parallel packet collector 287 collects packets arriving via the plurality of tunnels and transmits the collected packets to the counterpart host.

Figure 5:
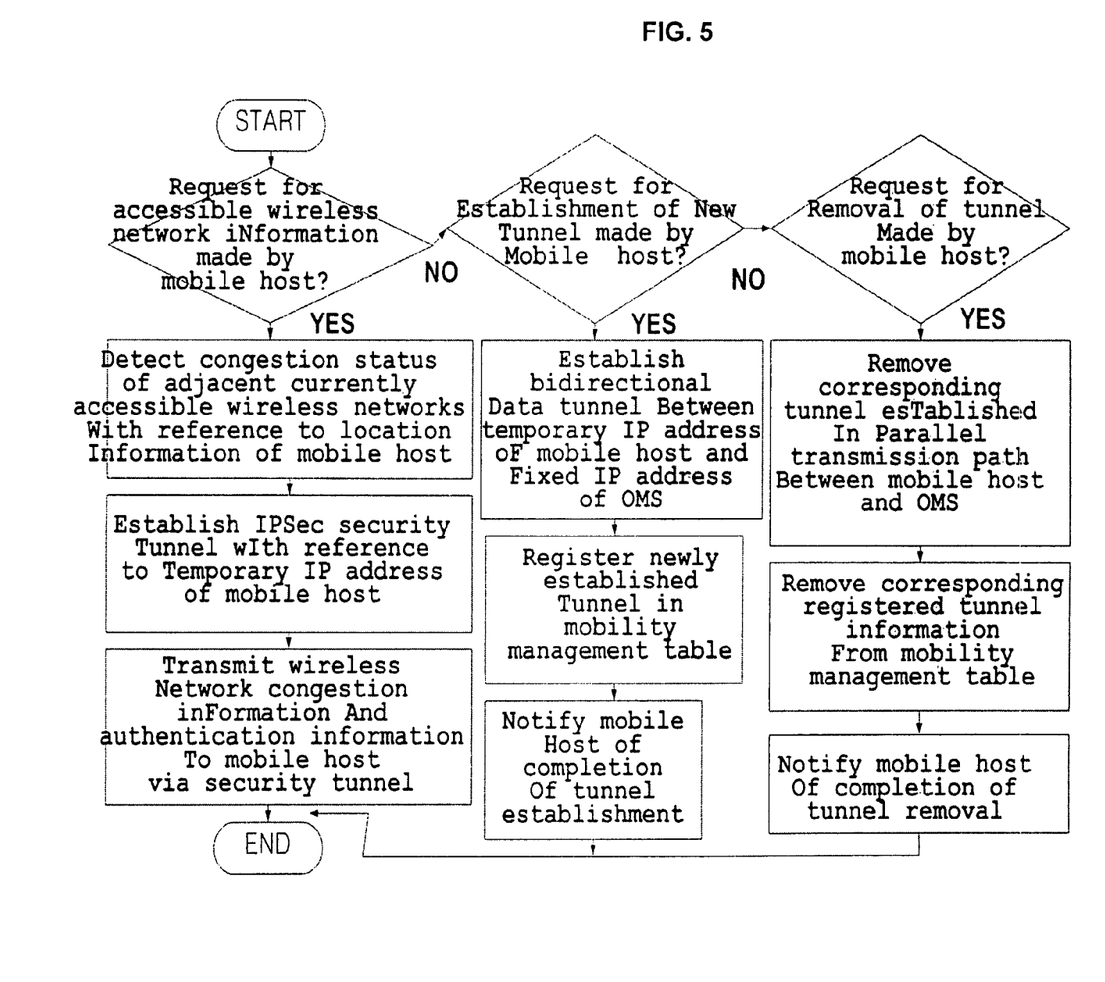
FIG. 5 is a flowchart showing the parallel transmission mobility management algorithm of the OMS according to the present invention.

The L3 mobility manager 280 and the parallel data transmission/reception unit 285 operate in conjunction with each other according to the parallel transmission mobility management algorithm shown in FIG. 5, and transmit and receive packets via a plurality of tunnels to the mobile host in parallel.

The QoS manager 260 manages the QoS of each tunnel established for the mobile host, in particular QoS such as packet loss, delay time and response time between the mobile host and the OMS. The security manager 262 is responsible for authentication, control and data encryption for the wireless network or the OMS, an event manager 264 processes events when they occur over a network, and an automatic configuration manager 264 assists automatic wireless network selection and configuration. The functions of the QoS monitor 290, the L3 mobility manager 280, the parallel packet distributor 286 and the parallel packet collector 287 are similar to those of the mobile host.

The OMS having the above-described construction efficiently supports IP-based real-time multimedia service regardless of the types of wireless networks when the mobile host moves between cells of wireless networks.

Figure 3:
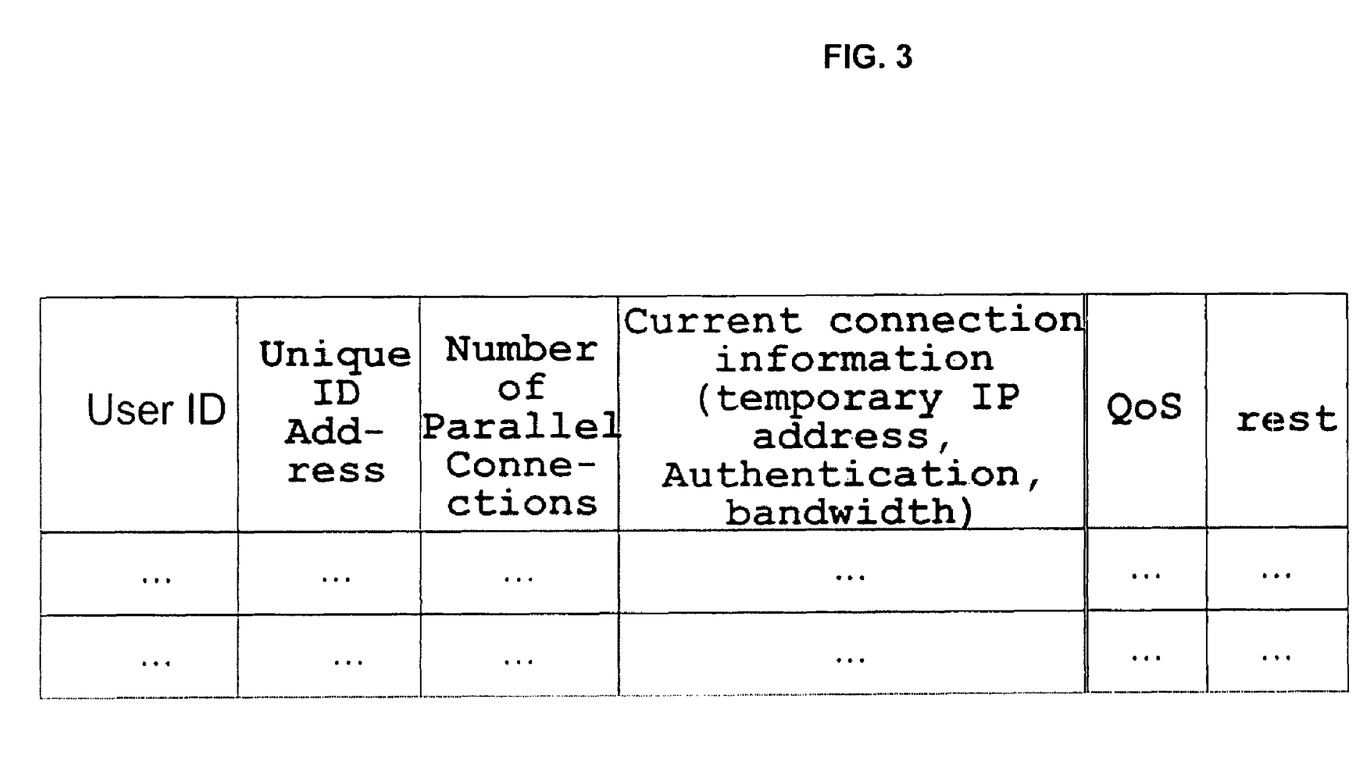
FIG. 3 is a diagram showing the detailed construction of a mobility management information table according to the present invention.

FIG. 3 is a diagram showing the detailed construction of the mobility management information table 250 of the OMS according to the present invention. Referring to FIG. 3, the user ID may be represented in the form of an e-mail address or a telephone number that is defined in the SIP standard, and the unique IP address refers to a home Internet address assigned to the user ID. The number of parallel connections refers to the number of parallel IP connections currently established for the mobile host having the current user ID. The current connection information refers to the current connection information of the mobile host. In the case where the mobile host uses n IP connections, the current connection information includes information about a temporary IP address, authentication and bandwidth, which is n-triple information. The effective bandwidth of QoS is defined as the sum of the bandwidths of n connections. The rest includes the current location information of the mobile host and the authentication of a wireless network accessible at the current location. Here, the unique IP address may be an IPv4 address or an IPv6 address. The reason for this is that in the case where hosts at both ends support a tunneling function, data can be exchanged via an end-to-end tunnel, with the IPv6 address being used as the unique IP address, thereby being able to support IPv6 application. Therefore, the structure for the mobility management of the OMS proposed by the present invention may use a mixture of an IPv4 address and an IPv6 address in the case where the same type of unique IP addresses at both ends are used and the same type of temporary IP addresses at both ends are used.

FIG. 4 is a flowchart showing an algorithm for inter-user call establishment and parallel data transmission call release that are performed in the OMS according to the present invention. As shown in FIG. 4, the OMS according to the present invention functions as a gateway for relaying call establishment signals between both ends during call establishment. In the case where signals use SIP, the host can process SIP signals, so that the role of the OMS is relatively simple. That is, when data is transmitted, the role of the OMS is the same as that of a conventional SIP gateway except that the OMS establishes a tunnel between the OMS and the user. In the case where the counterpart host and the mobile host are connected to the same router, it is not necessary to establish and use a channel for transmitting data as described with reference to FIG. 1.

Referring to FIG. 4, when user call establishment is requested from the user host B by host A, the OMS according to the present invention checks the current connection location and temporary IP address of the user host B. If the user host B is connected to the current external network, the user ID and IP address of the user host A are registered in the mobility management information table of the OMS and a call establishment signal message is transferred and relayed to the temporary IP address of the user host B, thereby completing call establishment. After the completion of the call establishment, a tunnel for transmitting new parallel data is established between the user host B and the OMS using a temporary IP address, and parallel transmission mobility management is performed. Thereafter, the OMS transfers data received from the user host B via the tunnel to the user host A, and transfers data received from the user host A to the user host B via the tunnel.

If the user host B is not connected to the current external network, a call establishment signal message is transferred and relayed to the unique IP address of the user host B, thereby completing call establishment. After the completion of the call establishment, the user host A transmits and receives multimedia data using the unique IP address of the user host B.

After the completion of the communication between the user hosts A and B is completed, the OMS relays a call release signal, removes the information of the user host A from the mobility information management table, and removes the tunnel to the user host B.

FIG. 5 is a flowchart showing the parallel transmission mobility management algorithm of the OMS shown in FIG. 4 in greater detail. The algorithm of FIG. 5 is executed after the call establishment of FIG. 4 has been completed. In FIG. 4, the location information or congestion of User_ID can be obtained by requesting network management information from each corresponding wireless network with reference to information about adjacent accessible wireless networks transmitted by User_ID. An access right or authentication information for a corresponding wireless network may be possessed by the OMS or directly by the mobile host user. Once the mobile host connects with the wireless network, the OMS detects QoS and bandwidth information via the corresponding wireless network, and stores and continuously modifies and complements it in the current connection information of the mobility management information table.

Referring to FIG. 5, when information about accessible wireless networks is requested by the mobile host, the OMS detects the congestion status of currently accessible adjacent wireless networks with reference to the location information of the mobile host, establishes an IPSec security tunnel with reference to the temporary IP address of the mobile host, and transmits the wireless network congestion information and the authentication information to the mobile host via the security tunnel. When a request for the establishment of a new tunnel is made by the mobile host, the OMS establishes a bidirectional data tunnel between the temporary IP address of the mobile host and the fixed IP address of the OMS, registers the newly established directional data tunnel in the mobility management information table, and notifies the mobile host of the completion of the tunnel establishment. When a request for the removal of the new tunnel is made by the mobile host, the OMS removes the corresponding tunnel from a path established between the mobile host and the OMS, deletes the registered information of the corresponding tunnel from the mobility management information table, and notifies the mobile host of the completion of the removal of the tunnel.

Figure 6:
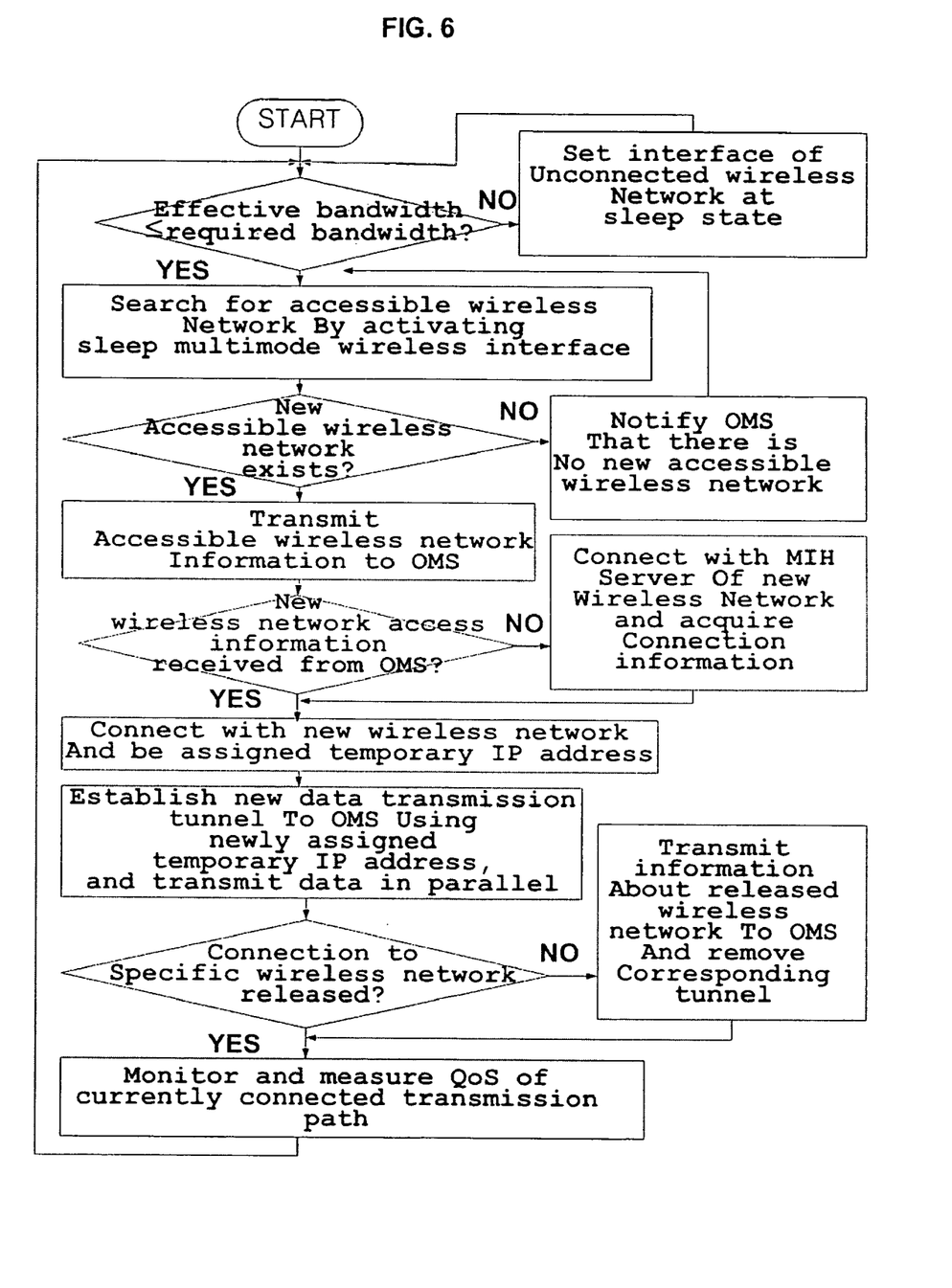
FIG. 6 is a flowchart showing the QoS guaranteeing mobility management algorithm of a mobile host according to the present invention.

FIG. 6 is a flowchart showing the QoS guaranteeing mobility management algorithm of the mobile host according to the present invention. In FIG. 6, it is assumed that a connection to a specific wireless network has been initially established on the basis of an access right. The mobile host first checks whether the effective bandwidth of a current transmission path meets a required bandwidth, and activates a sleep multimode communication interface using a wireless link detector if the effective bandwidth does not meet the required bandwidth. If there exists a new accessible wireless network, the mobile host transfers network information to the OMS via an existing wireless connection, and fetches an authentication method and the like required for connection.

If it is difficult to acquire access right information for the new wireless network from the OMS, the L2 mobility manager acquires access information from the MIH server if it can connect with the MIH server from the view point of a location. Thereafter, the L3 mobility manager connects with the new wireless communication network, and fetches a temporary IP address to be temporarily used. Furthermore, the L3 mobility manager establishes a tunnel with the OMS using the temporary IP address, establishes a new IP transmission path, establishes a parallel packet transmission path in conjunction with the existing transmission path, and transmits packets in parallel. By doing so, the effective transmission bandwidth is increased. If QoS is not met when the new channel is established with the OMS and packets are exchanged in parallel, a plurality of parallel data transmission tunnels is dynamically established with the OMS via a plurality of different wireless network accessible during movement until the QoS of the mobile host is guaranteed, and then data is transmitted. Finally, in the case where the intensity of radio waves is lowered because the mobile host moves away from the specific wireless network, the connection to the corresponding wireless network is released, notification is provided to the OMS, and then the corresponding tunnel is removed. The above-described process is repeated until the effective bandwidth is met. When the effective bandwidth is met, one or more unused wireless communication interfaces are made to enter a sleep state through the power manager of the mobile host, thereby reducing unnecessary power consumption.

When a new channel is established to guarantee QoS, the preparation for handover is performed in order to previously acquire a new temporary IP address in such a way as to connect with a DHCP server using 2 layer handover information using MIH-based or dedicated technology based on the movement of a mobile host before the completion of layer 2 handover, or in such a way as to acquire a new temporary IP address using an address automatic construction function, and the OMS is immediately notified of the temporary IP address after the completion of 2 layer handover, thereby providing a seamless mobility management function having no packet loss or time delay attributable to handover.

In brief, since the method and system for managing QoS-guaranteed fast mobility in various wireless networks according to the present invention, before a connection to a specific wireless network is released, dynamically establishes a new transmission path using a tunneling-based parallel transmission technique and transmits and receives data, packet loss or delay time attributable to handover does not occur, unlike in the existing various handover methods, in the case where a mobile host moves across an area where homogeneous or heterogeneous wireless networks overlap each other. Furthermore, the present invention enables the acquisition of a necessary bandwidth through a plurality of different accessible wireless networks, so that QoS can be guaranteed. In particular, unlike in most of the existing handover methods, the preparation for handover is started based on QoS, so that handover is started well before a connection is released due to the reduction in the intensity of radio waves, with the result that handover time delay required for the acquisition of an temporary IP can be reduced.

Since the present invention has the advantages of guaranteeing the QoS of IP-based real-time mobile multimedia service regardless of the types of wireless networks and providing a fast mobility management function when various mobile hosts, such as a mobile phone, an Internet phone, a PMP, an UltraPC, a smart phone and a notebook, move between cells of homogeneous or heterogeneous wireless networks, the present invention has high industrial applicability.

The present invention has an advantage of guaranteeing the QoS of IP-based real-time multimedia service regardless of the types of wireless networks and providing a fast mobility management function when various mobile hosts, such as a mobile phone, an Internet phone, a PMP, an UltraPC, a smart phone, and a notebook, move between cells of homogeneous or heterogeneous wireless networks.

Another advantage of the present invention is to provide a QoS-guaranteed fast mobility management function of, in the case where the quality of communication service of a connected wireless network is reduced due to the reduction in the intensity of received radio waves during the movement of a mobile host or the congestion of a network during the stop of the mobile host, enabling a mobile host to connect with a plurality of new wireless networks, to dynamically establish a bidirectional tunnel, and to transmit data in parallel, so that the reduced QoS can be increased, the function is independent of the upper transport and application layers, and there is no packet loss or time delay attributable to handover.

Still another advantage of the present invention is to provide an end-to-end mobility management function in the case where a mobile host is located in an OMS or two counterpart hosts have a tunneling function and communicate with each other.

Still another advantage of the present invention is to provide a QoS-guaranteed fast mobility management function that can be applied to both an IPv4 network and an IPv6 network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing QoS-guaranteed multimode fast mobility in an Open Mobility Management Server (OMS), the method being capable of efficiently supporting Internet Protocol (IP)-based real-time multimedia services in wireless networks regardless of types of wireless networks when a mobile equipped with a multimode communication interface including a plurality of wireless communication interfaces moves between cells of the wireless networks, the method comprising the steps of:

(a) when a request for call establishment with a specific counterpart host is made by the mobile host, registering and storing a user ID, a unique IP address of a user, a currently used temporary IP address and a current location of the mobile host, provided by the mobile host, in a mobility management information table;

(b) completing the call establishment between the mobile host and the counterpart host;

(c) after the call establishment between the mobile host and the counterpart host has been completed, establishing a tunnel between the OMS and the mobile host using a unique IP address of the OMS and a temporary IP address of the mobile host, and then transmitting data via the tunnel;

(d) when a new temporary IP address and wireless network information of a newly activated wireless communication interface are provided by the mobile host, establishing a new tunnel between the OMS and the mobile host using the unique IP address of the OMS and the new temporary IP address of the mobile host, and then transmitting and receiving data packets via the existing tunnel and the new tunnel in parallel; and (e) when a request for removal of one from currently activated tunnels is made by the mobile host, removing the corresponding tunnel.

2. The method as set forth in claim 1, wherein the step (b) comprises the steps of:

(b1) registering an IP address of the counterpart host in the mobility management information table; and (b2) transferring a call establishment and response signal to the temporary IP address of the mobile host and the IP address of the counterpart host, thereby completing the call establishment between the counterpart host and the mobile host.

3. The method as set forth in claim 1, wherein the step (d) comprises, when the new temporary IP address and the wireless network information of the newly activated wireless communication interface are provided by the mobile host, detecting congestion status or an access right for the corresponding wireless network, and then transmitting the information to the mobile host.

4. The method as set forth in claim 1, wherein the mobility management information table includes user identification information and unique IP address of the mobile host with which a call has been established, the number of parallel IP connections to the mobile host, current connection information and QoS information, and the current connection information includes a temporary IP address, authentication information and bandwidth information.

5. The method as set forth in claim 1, wherein the transmission and reception of data packets via the existing tunnel and the new tunnel in parallel at the step (d) comprises transmitting and receiving data via a plurality of tunnels between the OMS and the mobile host until the QoS of the mobile host is guaranteed.

6. The method as set forth in claim 5, wherein the QoS of the mobile host is determined by one or more of data transmission rate, bandwidth, packet loss rate, delay time and response time.

7. A system for managing QoS-guaranteed multimode fast mobility, comprising:

a mobile host equipped with a multimode communication interface including a plurality of wireless communication interfaces; and an Open Mobility Management Server (OMS) for supporting IP-based real-time multimedia services regardless of types of wireless networks when the mobile host moves between cells;

the mobile host comprises:

a call establishment unit for providing mobility management information to the OMS, and requesting call establishment with a specific counterpart host, thereby enabling the call establishment;

a mobility management unit for, after completion of the call establishment, establishing a new tunnel while operating in conjunction with the OMS, or, when QoS of a previously existing "old" tunnel is reduced, activating a sleep wireless communication interface, connecting with a new wireless network, being assigned a new temporary IP address, and providing the new temporary IP address to the OMS, thereby establishing the new tunnel;

a parallel data transmission/reception unit for transmitting and receiving data via a plurality of tunnels established by the mobility management unit in parallel; and a QoS monitor for monitoring communication service quality of the tunnel between the mobile host and the OMS, and transmitting the monitored information to the OMS; and the OMS comprises:

a mobility management information table for registering and storing mobility management information of the mobile host provided by the mobile host that has requested call establishment with the specific counterpart host;

a call establishment unit for completing call establishment between the mobile host and the counterpart host in response to the request for the call establishment;

a mobility management unit for, after the call establishment between the mobile host and the counterpart host has been completed, establishing a tunnel for transmitting data between the OMS and the mobile host, establishing a new tunnel between the mobile host and the OMS when a new temporary IP address and wireless network information of a newly activated wireless communication interface are provided by the mobile host, and removing one tunnel from currently activated tunnels when a request for the removal of the corresponding tunnel is made by the mobile host; and a parallel data transmission/reception unit for transmitting and receiving data to and from the mobile host via the plurality of established tunnels.

8. The system as set forth in claim 7, wherein the mobility management information includes a user ID, a unique IP address of a user, a currently used temporary IP address, and current location information of the mobile host.

9. The system as set forth in claim 7, wherein the mobility management unit of the OMS, when wireless network information of a newly activated wireless communication interface is provided by the mobile host, detects congestion status or an access right for the corresponding wireless network, and transmits the wireless network information of the newly activated wireless communication interface to the mobile host.

10. The system as set forth in claim 7, wherein the OMS further comprises a QoS manager for managing QoS of each tunnel established by the mobile host, and the QoS manager manages one or more of packet loss, delay time and response time between the mobile host and the OMS.

11. The system as set forth in claim 7, wherein each of the parallel data transmission/reception unit of the mobile host and the parallel data transmission/reception unit of the OMS comprises a parallel packet distributor for transmitting packets via a plurality of tunnels established between the OMS and the mobile host in parallel and a parallel packet collector for collecting packets arriving via the plurality of tunnels.

12. The system as set forth in claim 7, wherein the mobility management information table of the OMS includes user identification information and unique IP address of the mobile host with which a call has been established, the number of parallel IP connections to the mobile host, current connection information and QoS information, and the current connection information includes a temporary IP address, authentication information and bandwidth information.

13. A mobile host equipped with a multimode communication interface, comprising:
the multimode communication interface including a plurality of wireless communication interfaces;
a call establishment unit for providing mobility management information to an external Open Mobility Management Server (OMS), and requesting call establishment with a specific counterpart host, thereby enabling the call establishment;
a mobility management unit for, after completion of the call establishment, establishing a new tunnel with the OMS, or, when QoS of a previously existing "old" tunnel is reduced, activating a sleep wireless communication interface, connecting with a new wireless network, being assigned a new temporary IP address, and providing the new temporary IP address to the OMS, thereby establishing the new tunnel;
a parallel data transmission/reception unit for transmitting and receiving data via a plurality of tunnels established by the mobility management unit in parallel; and
a QoS monitor for monitoring communication service quality of the tunnel to the OMS, and transmitting the monitored information to the OMS;
wherein the mobile host can receive IP-based real-time multimedia services in conjunction with the external OMS regardless of types of wireless networks when the mobile host moves between cells.

14. An Open Mobility Management Server (OMS) comprising:
a mobility management information table for registering and storing registers and stores the user ID, user's unique IP address and currently used temporary IP address of a mobile host that is equipped with a multimode communication interface including a plurality of wireless communication interfaces and has requested a call establishment with a specific counterpart host, and the current location of the mobile host;
a call establishment unit for completing call establishment between the mobile host and the counterpart host;
a mobility management unit for, after the call establishment between the mobile host and the counterpart host has been completed, establishing a new tunnel for transmitting data between the OMS and the mobile host, or establishing a new tunnel between the mobile host and the OMS when a new temporary IP address and wireless network information of a newly activated wireless communication interface are provided by the mobile host, or removing one tunnel from currently activated tunnels when a request for the removal of the corresponding tunnel is made by the mobile host; and
a parallel data transmission/reception unit for transmitting and receiving data via the plurality of established tunnels;
wherein the OMS efficiently supports IP-based real-time multimedia services regardless of types of wireless networks when the mobile host moves between cells of the wireless networks.

\* \* \* \* \*